United States Patent
Bryant

(10) Patent No.: US 11,126,909 B2
(45) Date of Patent: Sep. 21, 2021

(54) CONTAINER ARRANGEMENT INCLUDING A WIRELESS COMMUNICATION DEVICE AND METHOD FOR OPERATING THE SAME

(71) Applicant: Novartis AG, Basel (CH)

(72) Inventor: Andrew Bryant, Basel (CH)

(73) Assignee: NOVARTIS AG, Basel (CH)

( * ) Notice: Subject to any disclaimer, the term of this patent is extended or adjusted under 35 U.S.C. 154(b) by 431 days.

(21) Appl. No.: 16/095,893

(22) PCT Filed: Mar. 13, 2017

(86) PCT No.: PCT/EP2017/055825
§ 371 (c)(1),
(2) Date: Oct. 23, 2018

(87) PCT Pub. No.: WO2017/186402
PCT Pub. Date: Nov. 2, 2017

(65) Prior Publication Data
US 2020/0372318 A1    Nov. 26, 2020

(30) Foreign Application Priority Data

Apr. 26, 2016 (EP) .................................. 16167131
Jun. 3, 2016 (EP) .................................. 16172924

(51) Int. Cl.
*B65D 55/06*     (2006.01)
*G06K 19/077*    (2006.01)
(Continued)

(52) U.S. Cl.
CPC ..... *G06K 19/07798* (2013.01); *B65D 55/028* (2013.01); *B65D 55/06* (2013.01);
(Continued)

(58) Field of Classification Search
None
See application file for complete search history.

(56) References Cited

U.S. PATENT DOCUMENTS

| 7,564,354 B2 | 7/2009 | Eren et al. |
| 2006/0214789 A1* | 9/2006 | Posamentier .... G06K 19/07798 340/545.6 |
| 2007/0152822 A1* | 7/2007 | Eren ................ G06K 19/07749 340/572.1 |

(Continued)

FOREIGN PATENT DOCUMENTS

| CN | 1281567 A | 1/2001 |
| CN | 1545681 A | 11/2004 |

(Continued)

OTHER PUBLICATIONS

International Search Report and Written Opinion dated May 15, 2017 in PCT Application No. PCT/EP2017/055825 (14 pages).

(Continued)

*Primary Examiner* — John F Mortell
(74) *Attorney, Agent, or Firm* — McDermott Will & Emery LLP

(57) ABSTRACT

A container arrangement (100) is disclosed, which is preferably destined for pharmaceutical products. The container arrangement includes a container body (110) and a first wireless communication systems (210) composed of a NFC system (210) including an NFC antenna (141). The container arrangement further includes a first and/or a second sensing-switching arrangement (143; 280) configured to include a preset status inhibiting a standardized operability of the first wireless communication system (210). The first sensing-switching arrangement (143) is configured to deregulate its preset status upon an initial opening event and the second sensing-switching arrangement (280) is configured to deregulate its preset status upon an unloading event.

14 Claims, 5 Drawing Sheets

(51) Int. Cl.
    *B65D 55/02* (2006.01)
    *G06K 19/07* (2006.01)
    *G06K 19/073* (2006.01)
    *H04B 5/00* (2006.01)

(52) U.S. Cl.
    CPC ... *G06K 19/0723* (2013.01); *G06K 19/07372* (2013.01); *H04B 5/0031* (2013.01); *H04B 5/0062* (2013.01); *H04B 5/0081* (2013.01)

(56) References Cited

U.S. PATENT DOCUMENTS

| | | | | |
|---|---|---|---|---|
| 2007/0152829 | A1* | 7/2007 | Lindsay | G06K 19/0717 340/572.3 |
| 2008/0069736 | A1 | 3/2008 | Mingerink et al. | |
| 2011/0254665 | A1 | 10/2011 | Lindsay et al. | |
| 2011/0313894 | A1* | 12/2011 | Dye | G06Q 10/087 705/28 |

FOREIGN PATENT DOCUMENTS

| | | |
|---|---|---|
| CN | 1991871 A | 7/2007 |
| JP | 2010-117933 A | 5/2010 |
| WO | 99/31625 A1 | 6/1999 |
| WO | 02/095675 A1 | 11/2002 |

OTHER PUBLICATIONS

International Preliminary Report on Patentability under Chapter II dated Aug. 23, 2018 in PCT Application No. PCT/EP2017/055825 (24 pages).
Extended European Search Report dated Jul. 5, 2017 in European Patent Application No. 16172924.9.
Office Action dated Jan. 5, 2021 in Chinese Patent Application No. 201780025874.4, and English translation thereof.
Office Action dated Apr. 20, 2021 in Japanese Patent Application No. 2018-555762, and English translation thereof.

* cited by examiner

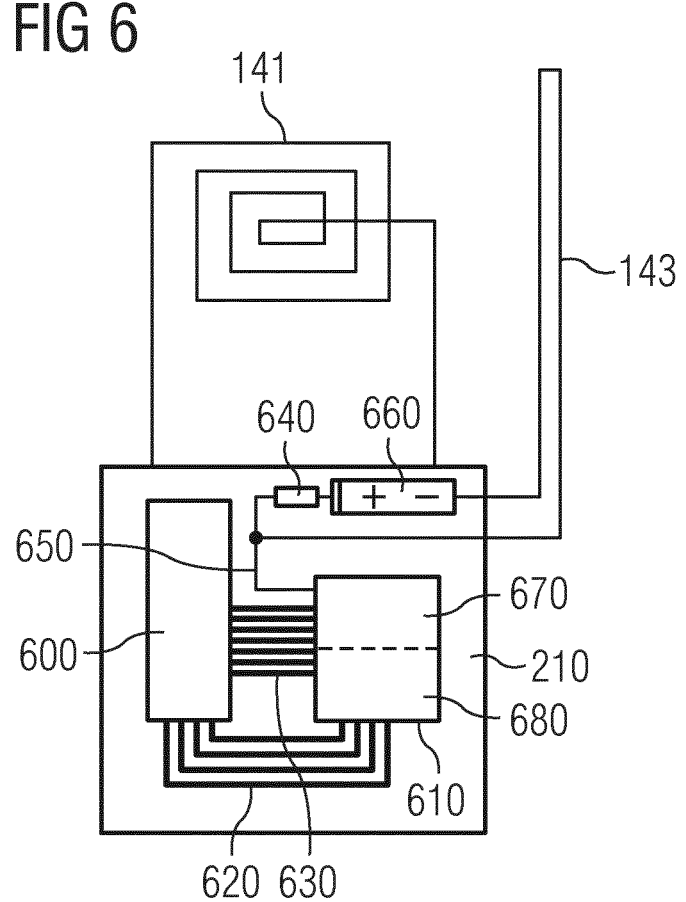

CONTAINER ARRANGEMENT INCLUDING A WIRELESS COMMUNICATION DEVICE AND METHOD FOR OPERATING THE SAME

RELATED APPLICATIONS

This application is a United States National Phase under 35 U.S.C. § 371 of International Application No. PCT/EP2017/055825, filed on Mar. 13, 2017, which claims priority to European Patent Application No. 16172924.9, filed Jun. 3, 2016 and also European Patent Application No. 16167131.8, filed Apr. 26, 2016, all of which are hereby incorporated by reference in their entirety for all purposes.

BACKGROUND

The present invention relates generally to a container arrangement, in particular for containing or dispensing pharmaceutical products. The container arrangement is equipped with a wireless communication device, being usable for contactless authentication and tracking of products.

For contactless authentication the technology of 'Near Field Communication' also called NFC has been proposed. Near Field Communication (NFC) is a short-range wireless communication technology that has been developed for interactive use in consumer electronics, mobile devices and PCs. This technology enables the exchange of data between two devices in close proximity and is an extension of the proximity-card standard for 'Radio Frequency Identification Devices (RFID)'.

A NFC based communication may be established between two NFC entities, one operating as a contactless tag attached to a product and the other operating as a contactless NFC reader/writer which can be embedded in a stationary or in a mobile device, even such as a smart phone. Due to the simplicity and unneeded battery power, an RFID label for NFC can be very small and inexpensive although the data storage capacity which can be read or written from and to the NFC entity on the RFID label is formidable.

A container arrangement bearing an RFID label can be automatically or manually individualized at the manufacturing site by writing product relevant information such as the unique identification number (ID), product type, date of production, storage life, site of production etc. in the NFC device on the RFID label. With respect to pharmaceutical products this information can be read and verified in a pharmacy for instance to check the storage life. Further information can be added by writing into the NFC device, for instance, the data of emittance from storage and patient details as a patient's name, date of birth, etc.

EP 1402470 B1 discloses an RFID label attached to a medical container, wherein the RFID label represents a NFC entity and comprises an integrated circuit placed in the middle of a square shaped antenna and a breakable conductive loop laid on a peel away or cut off cover attached to the container as a RAID seal, which will break, when the container is opened for the first time after production. The interruption of the conductibel loop is detectable by a contactless NFC reader/writer when in paired communication with the RFID label of the medical container.

Further, RFID labels are known that have a so called "tamper-evidence" functionality that does not allow data, which is held in the RFID label, to be read after the product has been opened for the first time. This measure is achieved through a breaking of the RFID antenna, when the product is opened.

Practice showed however that destroying accessibility to the data held in the RFID label after opening is no appropriate solution for receptacles that contain more than one unit of a solid matter or of a dosis of liquid. On the other hand, readability of the data by unauthorized persons, for instance, personnel commissioned for shipment, turned out to become critical.

In view of the foregoing a solution was desired to overcome the above mentioned limitations.

SUMMARY OF THE INVENTION

In various embodiments a container arrangement, preferably for pharmaceutical products is disclosed. In further embodiments the container arrangement comprises a container body, which includes an interior for receiving solid matters or liquids; a first wireless communication system, wherein the first wireless communication system is composed of a Near Field Communication system (NFC) including a Near Field (NFC) antenna formed by a conductor arranged in one or more windings, a controller and a data storage area. The container arrangement further comprises a first sensing-switching arrangement and/or a second sensing-switching arrangement. The first sensing-switching arrangement is configured to include a first preset status disabling a primary operation mode of the first wireless communication system, and wherein the first sensing-switching arrangement is configured to deregulate; preferably irreversibly deregulate, its first preset status upon an initial opening event, which is preferably triggered by a very first opening of an aperture of the container body. The second sensing-switching arrangement is configured to include a second preset status disabling the primary operation mode of the first wireless communication system, wherein the second sensing-switching arrangement is configured to deregulate its second preset status upon an unloading event. In further embodiments the second sensing-switching arrangement is configured to deregulate its second preset status only for a duration of the unloading event.

In still further embodiments the first preset status and/or the second preset status includes a fully disabled operability of the Near Field (NFC) antenna or the Near Field communication system (NFC).

In other embodiments the first preset status and/or second preset status includes an enabling of an alternative operation mode; preferably of a non-standardized operation mode of the Near Field (NFC) antenna or the Near Field Communication system (NFC).

In still other embodiments the first preset status or the second preset status includes a disabled accessibility of the controller to the data storage area, and wherein preferably the Near Field Communication system (NFC) includes a further data storage area, which is different to the data storage area, and to which accessibility is enabled when accessibility to the data storage area is disabled and to which accessibility is disabled when accessibility to the data storage area is enabled.

In further embodiments the first sensing-switching arrangement comprises a breakable conductive loop which breaks on the initial opening.

In still further embodiments the first sensing-switching arrangement comprises a breakable conductive loop connected in parallel to the Near Field (NFC) antenna and disposed such that an initial opening of the aperture breaks the breakable conductive loop.

In other embodiments the breakable conductive loop comprises an electronic component or a circuit composed of more than one electronic component looped in the breakable conductive loop therewith shifting a resonance frequency of the Near Field (NFC) antenna in an area outside a range; preferably outside an NFC range, proposed by a Near Field Communication (NFC) Standard.

In still other embodiments the breakable conductive loop comprises one or more windings of a breakable conductor, preferably a plurality of windings forming an auxiliary Near Field (NFC) antenna.

In yet other embodiments the first sensing-switching arrangement comprises a breakable conductive loop connected at one end to a select connection line of the data storage area and/or further data storage area; preferably to an address connection line of the data storage area and/or further data storage area; and disposed such that an initial opening breaks the breakable conductive loop.

In further embodiments the second sensing-switching arrangement is configured such that only a first unloading act from the container interior triggers the unloading event or that the first and any subsequent unloading acts from the container interior trigger the unloading event, respectively.

In still further embodiments the second sensing-switching arrangement comprises a contact switch looped into the conductor of the Near Field (NFC) antenna; and wherein the contact switch is configured such that it will close circuit upon a mechanical force, exerted for an unloading act.

In yet further embodiments the second sensing-switching arrangement comprises a contact switch connected to a select connection line of the data storage area and/or further data storage area; preferably to an address connection line of the data storage area and/or further data storage area; and wherein the contact switch is configured such that it will close or open circuit upon a mechanical force, exerted for an unloading act.

In other embodiments the container arrangement further comprises a further wireless communication system, which comprises a further Near Field (NFC) Communication system including a further Near Field (NFC) antenna formed by a further conductor. The container arrangement also comprises a third sensing-switching arrangement configured to include a preset status enabling an operability of the further wireless communication system, wherein the third sensing-switching arrangement is configured to deregulate; preferably to irreversibly deregulate, its preset status upon an initial opening event or an unloading event; wherein preferably the third sensing-switching arrangement comprises a further breakable conductive loop disposed such that an initial opening or an unloading breaks the further breakable conductive loop.

In still other embodiments the container arrangement further comprises a second wireless communication system configured to include a preset status of disabled operability; and wherein the first wireless communication system when in the primary operation mode, is configured to deregulate the preset status of the second wireless communication system; wherein preferably the first wireless communication system is configured to deregulate the preset status of the second wireless communication system irreversibly or only for a time period to be determined by the first wireless communication system or only for a time period in which the primary operation mode is enabled.

In further embodiments the second wireless communication system includes at least one of an IEEE 802.11 (Wireless LAN) system or a digital multiplexer (DMX) interface system or a digital addressable lighting interface (DALI) system or a ZigBee system or a Bluetooth system, which is preferably configured as a Bluetooth Low Energy (BILE) system.

In still other embodiments the container arrangement further comprises an energy storing element, wherein the second wireless communication system is configured to be powered by the energy storing element.

In further embodiments at least the first wireless communication system is deposited on a carrier layer forming an RFID label. In another aspect of the disclosure a method for operating a wireless communication system of a container arrangement, preferably for pharmaceutical products is provided. The container arrangement having a container body and a first wireless communication system (210) composed of a Near Field Communication system (NFC). A first sensing-switching arrangement includes a first preset status disabling a primary operation mode of the first wireless communication system and/or a second sensing-switching arrangement includes a second preset status disabling the primary operation mode of the first wireless communication system; the method comprises deregulation of the first preset status of the first sensing-switching arrangement (143), preferably irreversibly, upon an initial opening event; preferably triggered by a very first opening of an aperture (126) of the container body (110), and/or deregulation of the second preset status of the second sensing-switching arrangement (280) upon an unloading event.

BRIEF DESCRIPTION OF THE DRAWINGS

Other aspects, objectives and advantages of the invention or of its embodiments will become apparent on reading the detailed description in conjunction with the following drawings.

In the drawings, like reference characters generally refer to the same parts throughout the different views. The drawings are not necessarily to scale, emphasis instead generally being placed upon illustrating underlying principles.

FIG. 6 shows a schematic block view of structural elements of a first NFC system having switchable data storage areas.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Figure 1:
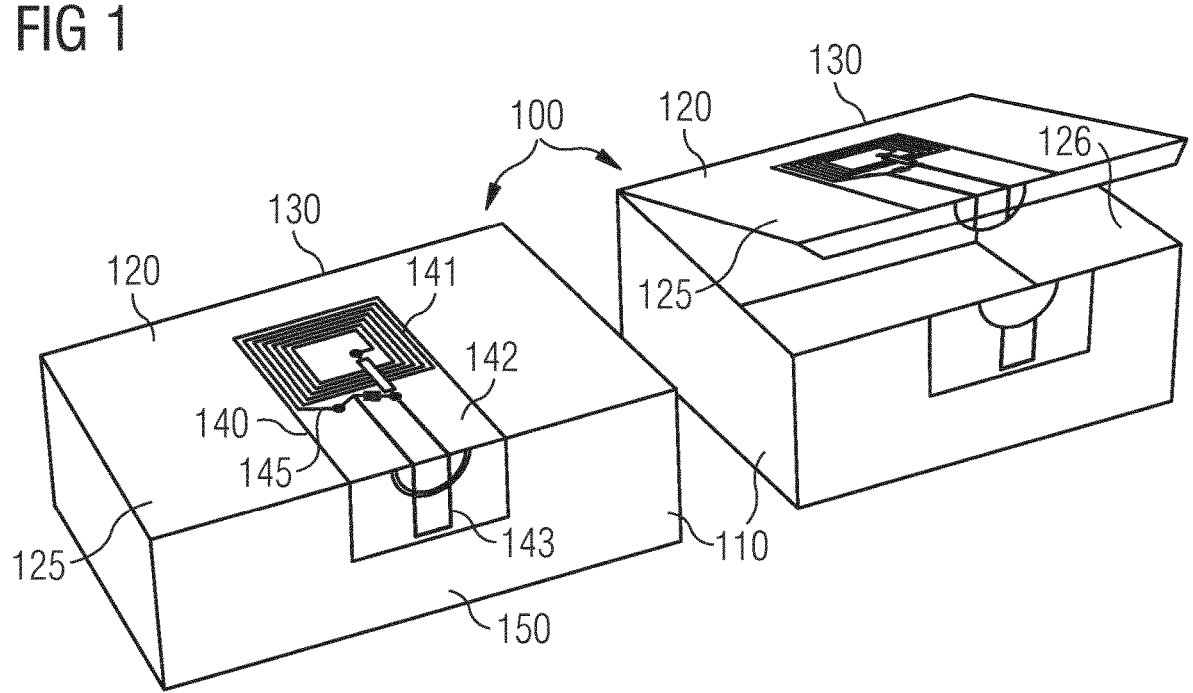
FIG. 1 shows schematically a case in a sealed condition and in an opened condition respectively, wherein the case is bearing an RFID label on its lid.

FIG. 1 illustrates in a schematically view a simple container arrangement 100 in a closed and in an open condition, respectively. The container arrangement 100 includes a container body such as a cubical case 110 (denominated as a case 110 in the following), which may be an ordinary ridged carton and which is able to contain numerous packages or fluid receptacles it its interior for safe storing and transport. The case 110 includes an upper side 120, which is angled along one of its edges 130 to the case 110 therewith serving as a lid 125 to the case 110, wherein the lid 125 closes an aperture 126 of the case 110, such that the aperture 126 of the case 110 is preferably re-closable.

The lid 125 bears an RFID label 140, which extends over the edge which is opposite to the angled one of the lid 125, from the surface of the lid 125 down to a front side wall 150 of the case 110. The RFID label 140 includes an NFC system with an NFC antenna 141 formed by a conductor 145 arranged in multiple nested winding on a rectangular carrier layer 142 and will be described in more detail in connection with the following figures.

The RFID label 140 further includes a breakable conductive loop 143, which represents a first sensing-switching arrangement and which is also born by the carrier layer 142 and which has a longitudinal extension with opposing end portions. The RFID label 140 is affixed to the case 110 such that one of the opposing end portions is arranged on the surface of the lid 125 and the other one is arranged on the front side wall 150.

Since the RFID label 140 has been affixed to the case 110 and thereby sealing the case after filling of the case 110 and closing the lid 125, the breakable conductive loop 143 is unbroken, as shown by the left part of the figure. The breakable conductive loop 143 remains unbroken till the case 110 will be opened for the first time after sealing by lifting the lid 125, as shown by the right part of the figure.

Therewith a very first opening of the aperture 126 which breaks the breakable conductive loop 143 is an initial opening event which irreversibly transfers a container condition from an unopened to an opened condition.

Figure 2A:
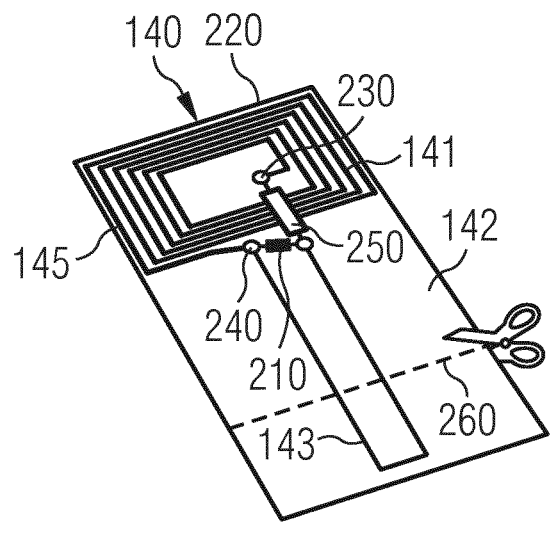
FIG. 2A shows schematically an RFID label with a conductive loop.

FIG. 2A illustrates an RFID label 140, which may be attached to any container, for example, to a case 110 as shown in the previous figure. The RFID label 140 is composed by the Near Field Communication (NFC) antenna 141 (in the following denominated as NFC antenna 141) an electronic NFC device 210, both are disposed in the area of one end 220 of the rectangular carrier layer 142, which is extending in a longitudinal direction. It is to be noted that in the following the electronic NFC device 210 is treated to fully represent a NFC system (210), insofar terms NFC system and electronic NFC device are used as synonyms.

The conductor 145 forming the NFC antenna 141 has been arranged in one or more nested windings around an inner periphery, which may be rectangular. The conductor 145 includes a first end 230, which is located at the inner periphery, and a second end 240, which is located at an outer periphery of the nested windings. The first end 230 and the second end 240 of the conductor 145 are both located opposite to the one end 220 of the rectangular carrier layer 142.

The first end 230 is electrically connected to a bridging element 250, which bridges the windings on a side where the second end 240 of the conductor 145 is arranged, such that both ends 230, 240 of the conductor 145 are electrically accessible close to each other at the outer periphery.

The electronic NFC device 210 is arranged at the outer periphery and is electrically connected to the first end 230 of the conductor 145 via the bridging element 250 and to the second end 240 of the conductor 145.

A breakable conductive loop 143, representing a first sensing-switching arrangement is also arranged on the carrier layer 142 and extends from the electronic NFC device 210 to another end of the rectangular carrier layer 142, which is opposite in the longitudinal direction to the one end 220 of the rectangular carrier layer 142.

In an area between the electronic NFC device 210 and the other end of the rectangular carrier layer 142 a dashed cutting line 260 shown on the figure in combination with a symbolized scissor is to be understood as a recommendation, how the RFID label 140 could be placed on the surface of the lid 125 with a part of it extending onto the front side wall 150. The dashed cutting line 260 is supposed to be aligned with the front edge of the lid 125, which causes cutting of the RFID label 140 and consequently the breakable conductable loop 143 along the dashed cutting line 260, when the lid 125 is opened.

The breakable conductive loop 143 is basically composed of two parallel conductor paths, which are connected with one end respectively to the electronic NFC device 210 and which are connected at the respective other end to each other. The respective other ends are deposited distal to the electronic NFC device 210.

The breakable conductive loop 143 is therewith connected in parallel to the conductor 145 forming the NFC antenna 141. Thus, the breakable conductive loop 143—as long as unbroken—is providing a low resistant short circuit to the NFC antenna 141.

The resulting effect is that the NFC antenna 141 will be unable to provide energy to the NFC electronic device 210, which will consequently be not accessible by read or write attempts performed by an NFC reader/writer (not shown). In other words, in a preset status the operability of the NFC antenna 141 is fully disabled and no NFC-communication can be performed.

Upon an initial opening event, such as when the very first opening of an aperture 126 occurs, the preset status is deregulated, which means that the preset status ends and the NFC antenna 141 will be enabled and therewith the NFC electronic device 210 will gain its full operability according to the NFC standards, which is its primary operability or in other words, it is the primary operation mode of the NFC electronic device 210.

It may benoted that throughout the entire disclosure the term "deregulate" is used as an equivalent to the term "decontrol" in the sense that an initial status, which may include restrictions ends and a different status, which does not include the restrictions of the initial state is subsequently enabled.

Breaking of a conductive loop 143 is a non-complex example for electronically recognizing, i.e. sensing, and reacting, e.g. switching, on an initial opening event. In detail, at first the breaking of the breakable conductive loop 143 is sensed and then the NFC antenna 141 or the NFC device 210 is enabled, e.g. switched on. It is to be noted that in certain embodiments a more complex arrangement may be provided with a sensing means being separate from a switching means. For the ease of description however, the aspect of sensing has been mostly neglected throughout the specification, because the reaction, e.g. switching, presumes the sensing, e.g. of the breaking of the breakable conductive loop 143. Anyway the breaking of the conductive loop 143 can be considered as the enabling momentum that triggers communicative accessibility.

In an embodiment of the above described RFID label 140, a preset status of the first sensing-switching arrangement, which is exemplary represented by the breakable conductive loop 143, includes an enabling of a non-standardized operation mode of the NFC system. Thus, when the breakable conductive loop 143 is unbroken, nevertheless a non-standardized communication is performable. For the non-standardized communication a modified, non NFC standardized reader/writer (not shown) is adjusted, beyond other characteristics, to provide an extreme magnetic field strength that is sufficient to power the electronic NFC device 210 on the described RFID label 140 through the breakable conductive loop 143 which is short circuiting the NFC antenna 141.

In a further embodiment the breakable conductive loop 143 itself is arranged as an NFC antenna with more than one nested windings, which may help to improve the accessability to the NFC devive 210 on the RFID label 140 by an non NFC standardized reader/writer (not shown). Since the unbroken breakable conductive loop 143 is connected in parallel to the NFC antenna 141, the breakable conductive loop 143, when itself arranged as an antenna, may form in combination with the parallel connected NFC antenna 141 a type of NFC antenna that may allow access to the NFC device 210 by a non NFC standardized reader/writer (not shown).

Thus, writing data on the RFID label 140—having an unbroken breakable conductive loop 143—during production and packing will be facilitated, because RFID labels taken off the shelve could be used and no writing process prior to the make of the RFID labels would be required.

Figure 2B:
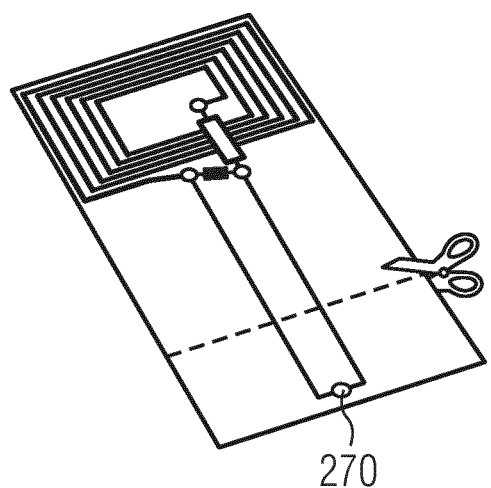
FIG. 2B shows schematically an RFID label with a conductive loop including a passive electronic component such as a capacitor.

FIG. 2B illustrates an RFID label 140, which may be alternatively attached to any container, for example a case 110 as shown in FIG. 1. The RFID label 140 is composed in a very similar manner to the one of the previous figure, so for its description it can be referred to that provided in connection with FIG. 2A to a large extent in order to avoid redundancy.

The RFID label 140 shown differs from the previously described solely in the electrical consistency of its breakable conductive loop 143. Further to the structure of the previously described breakable conductive loop 143, the breakable conductive loop 143 of the RFID label 140 now includes a capacitor 270. Thus, the NFC antenna 141—when the breakable conductive loop 143 is unbroken—is short circuited by a capacitor 270 and to be precise by a series connection composed of the ohmic resistance of the breakable conductive loop 143, the capacitor 270 and the reactive component of the breakable conductive loop 143.

Such a parallel connection to the NFC antenna 141 will shift the resonance frequency of the NFC antenna 141 on the RFID label 140 far away from the original one, which should be at least near the NFC standardized carrier frequency of 13.56 MHz for good coupling. Consequently, a communication between the NFC entity on the RFID label 140 and an NFC reader/writer (not shown), which works according to the international standards, will be inhibited as long as the breakable conductive loop 143 is unbroken.

However, a modified, non NFC standardized reader/writer (not shown), which may be used in the coarse of charging and packaging of a container, for instance a case 110 as shown by FIG. 1, which is destined to bear an RFID label 140, will be capable to adjust the shifted non-standardized resonance frequency caused by the capacitor 270 in the breakable conductive loop 143 of the RFID label 140. Therewith the non NFC standardized reader/writer will be capable to supply the electronic NFC device 210 on the RFID label 140 with energy and perform write and/or read operations.

As soon as the breakable conductive loop 143 is broken, which means that the preset status of the first sensing-switching arrangement, exemplary represented by the breakable conductive loop 143, is deregulated, i.e. ceased, and the NFC system on the RFID label 140 will gain its primary operation mode and will be accessible by a standardized NFC reader/writer (not shown).

It is to be mentioned that the capacitor 270 is to be considered only as an example for any electronic components or any assembly of electronic components, which will cause a change of the resonance frequency of the NFC antenna 141 in the sense of the above described embodiment.

Figure 2C:
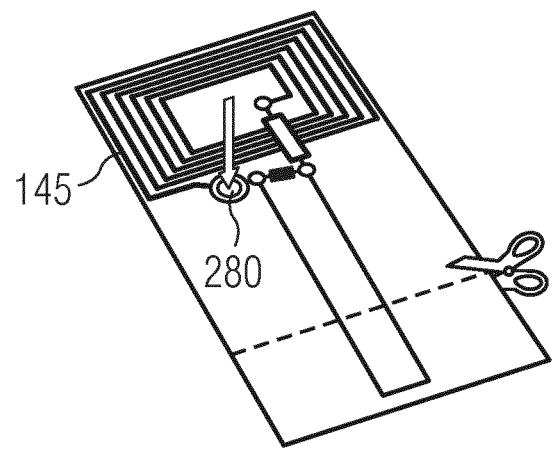
FIG. 2C shows schematically an RFID label with a conductive loop and a pressure activated switch.

FIG. 2C illustrates an RFID label 140, which may be alternatively attached to any container, for example, a case 110 as shown in FIG. 1. The RFID label 140 is composed in a very similar manner to the ones of the previous figures, so for its description it can be referred to that provided in connection with FIG. 2A and/or FIG. 2B to a large extend in order to avoid redundancy.

The RFID label 140 distinguishes over the previously described RFID labels in a second sensing-switching arrangement 280, exemplary represented by a pressure activatable switch 280, wherein the RFID label 140 does not necessarily have to include a first sensing-switching arrangement 143.

The second sensing-switching arrangement 280 in general serves for disabling the primary operation mode of the NFC system 210 till an access to the solid matters or liquids contained in the interior of a container body takes place, in other words till an unloading or a delivery takes place. Thereby it is up to the needs, whether a very first access is to enable the primary operation mode, which will be maintain from then on, or whether each access is to enable the primary operation mode, which will be terminated when the access act is finished.

In the provided example the pressure activatable switch 280 (in the following denominated as switch 280) is of a type of a normally open contact and is looped into the conductor 145 forming the NFC antenna 141. The switch 280 is arranged preferably at the outer periphery of the NFC antenna 141 on the carrier layer 142. Upon exertion of a pressure, which is symbolized in the figure by an arrow directed onto the switch 280, the contacts of the switch will close, i.e. the preset status of the switch 280 is deregulated, therewith connecting the conductor 145 of the NFC antenna 141 and consequently making the NFC antenna 141 operable.

The switch 280 can, for instance, be realized by a board contact design of which various modifications are known in the art. Such a board contact design is composed in principle of two neighboring conductor paths both arranged on a common plane, for example on the carrier layer 142, such that a conductive element brought into contact with both of the neighboring contacts paths simultaneously, will close the switch 280.

An RFID label 140 that is equipped with the switch 280 will be prevented from functioning, i.e. from communicating with a NFC reader/writer (not shown), until the switch 280 is activated. The switch 280 can be of the type of an off-on switch, having a preset state (e.g. an off-state) and an following state (e.g. an on-state) after activation that will be maintained even if the assertion of pressure force terminates. The switch 280 can also be of the type of a push-button, then the switch 280 takes the following stateonly as long as the switch 280 is activated by the assertion of a pressure force. That push button type of a switch 280 allows a communication during each unloading act, i.e. delivery act, from a container, thereby allowing to timely trace, when a unloading act is performed and moreover to trace how many unloading acts will be available till the container will be emptied.

The second sensing-switching arrangement 280, in particular, if a first sensing-switching arrangement 143 is not provided, may also include a preset state that enables an alternative operation mode, as a non-standardized operation mode such as described with respect to the first sensing-switching arrangement 143. For an RFID label 140 that is equipped with both the first and second switching arrangements 143, 280 according to any of the above described types and embodiments, an activation of the switch 280 by an unloading act may be a further event that has to happen in addition to the initial opening event (e.g. recognized by breaking the breakable conductive loop 143) in order to make the RFID label 140 operable for a communication with a NFC reader/writer (not shown).

However, it may also be appropriate to provide different preset status to the first and second sensing-switching arrangements 143, 280, for example, the preset status of the first sensing-switching arrangement 143 may include a fully disabled operability of the NFC system 210 and the preset status of the second sensing-switching arrangement 280 may include an enabled non-standardized operation mode of the NFC system 210.

Figure 3A:
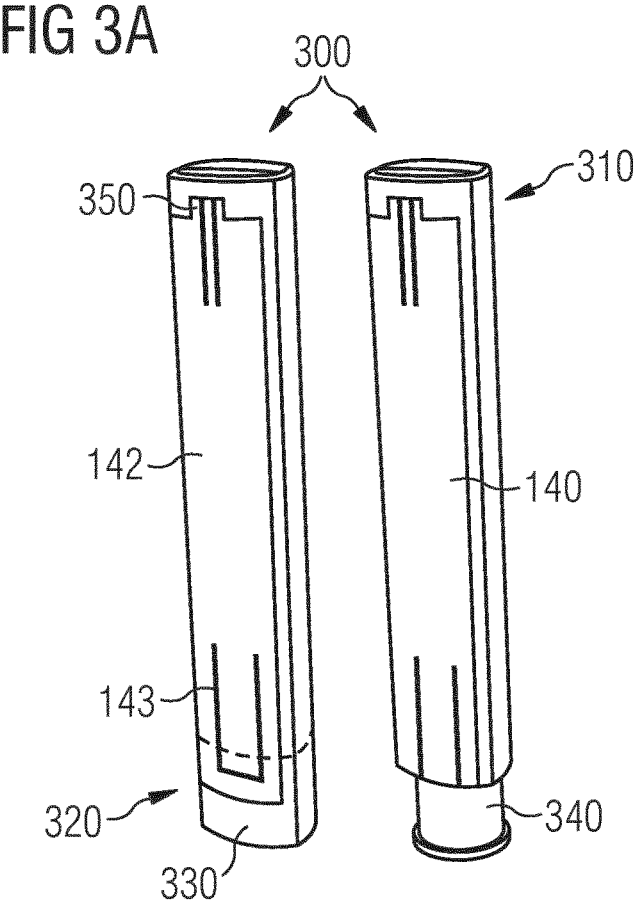
FIG. 3A shows schematically an pharmaceutical injector device of a roughly cylindrical shape with a detachable cover on one end and a actuation or indication button on the other end.

FIG. 3A illustrates in two conditions an autoinjector device 300 as an example for a container, supposed to contain a pharmaceutical liquid. The autoinjector device 300 (in the following denominated as autoinjector 300) has basically a cylindrical shape with a top cover portion 310 and a bottom cover portion 320.

The top cover portion 310 is construed as an actuating part for an activation of the autoinjector 300 upon assertion of a pressure force oriented in a direction along a cylinder axis towards the bottom cover portion 320. The bottom cover portion 320 includes a removable protective cap 330, which protects a contact tube 340 wrapping an injection needle (not shown), and which is closing an aperture of the autoinjector device 300.

The autoinjector 300 bears an RFID label 140 on its outer surface, wherein the RFID label 140, apart from a electronic NFC device and a NFC antenna (both not shown), includes a first switch arrangement 143, represented by a breakable conductive loop 143 and a second sensing-switching arrangement represented by a switch (not shown) arranged on the carrier layer 142.

The breakable conductive loop 143 extends onto the protective cap 330 at the bottom cover portion 320 and will be broken when the protective cap 330 is removed at the initial opening of the autoinjector 300. The switch is deposited on an extension 350 of the carrier layer 142, which is inserted into the actuating part at the top cover portion 310.

Figure 3B:
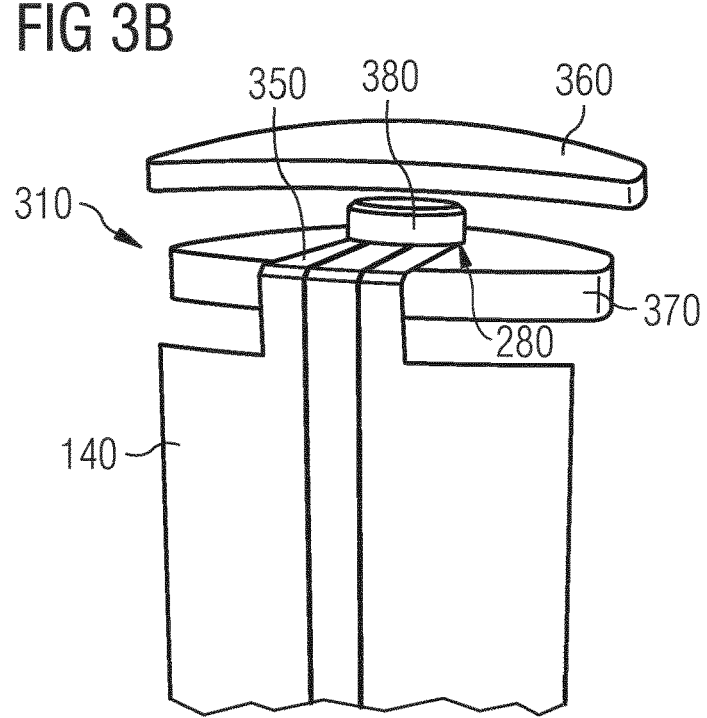
FIG. 3B shows schematically the actuation button of the injector device.

FIG. 3B illustrates in a detailed perspective view the actuating part at the top cover portion 310 of the autoinjector 300 shown in the previous figure. The actuating part is composed of a trigger component 360 and an anvil component 370, being arranged below. Both are basically circular disc shaped, arranged parallel to each other and with a respective center point oriented in the cylinder axis.

Between the trigger component 360 and the anvil component 370 the extension 350 of the carrier layer 142 is disposed, wherein the extension 350 is bearing the board contacts of the switch 280, which is located around the center point. An actuator component 380 is disposed between the trigger component 360 and the extension 350 of the carrier layer 142 and is placed on the switch 280.

A pressure force, which is necessary to activate the autoinjector 300 to deliver, i.e. to unload, a dosis, is exerted to the trigger component 360. From the trigger component 360 the pressure force is conveyed to the actuator component 380, which compresses the switch 280 of the RFID label 140 against the anvil component 370, whereby the switch 280 is closing.

Figure 4:
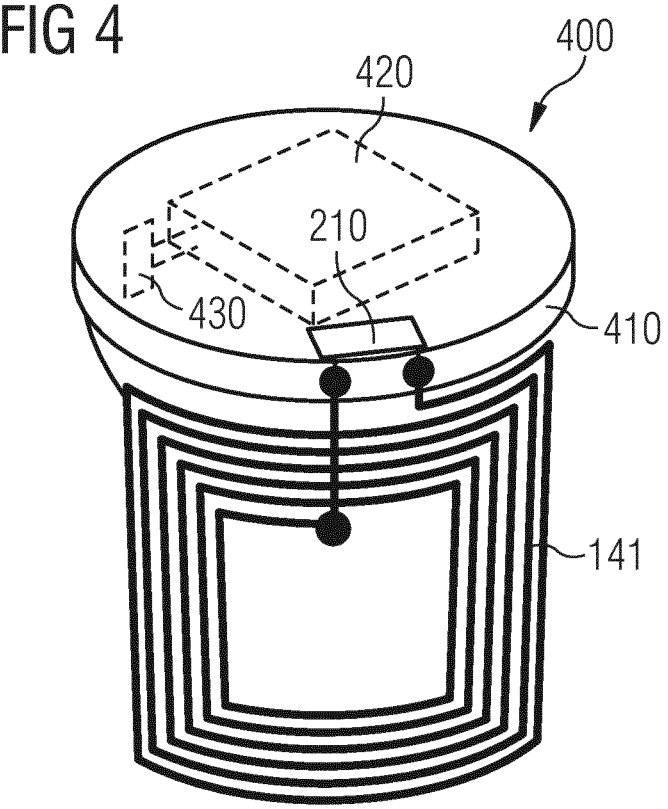
FIG. 4 shows schematically a reusable communication arrangement for an advanced container.

Although in the above it is described that a pressure force is necessary to activate the autoinjector 300 to deliver, the pressure force has not to be applied necessarily on top of the trigger component 360. It may be alternatively applied, for instance by holding the autoinjector 300 at its outside wall. In such a case the trigger component 360 when operated with the consequence that the switch 280 closes, may be used only for indication purposes. In that kind of embodiments the trigger component 360 is to be operated in the course of the first delivery, and the switch 280 will remain closed permanently afterwards. FIG. 4 illustrates in a perspective schematic view an embodiment of a communication arrangement 400, which may be integrated as a reusable module in an highly complex container arrangement (not shown), such that of an injector containing pharmaceutical liquids, and being further equipped with numerous measuring means as sensors (e.g. temperature sensors, acceleration sensors, pressure sensors) and a real time clock device and even with a microcontroller for collecting the data provided from the sensors and the real time clock device.

The communication arrangement 400 includes as a first wireless communication system an NFC system 210 having an NFC antenna 141, which is connected to a electronic NFC device 210 housed in a circular disc shaped plate 410, e.g. being part of a seal of cylindrical/tubular container.

In addition to the first wireless communication system 210 a second wireless communication system 430 is also housed in the disc shaped plate 410. In accordance with some embodiments, the second wireless communication system 430 may be configured to communicate utilizing any of a wide range of wireless communications protocols, including, for example: (1) a digital multiplexer (DMX) interface protocol; (2) a IEEE 802.11 (Wi-Fi) protocol; (3) a Bluetooth protocol; (4) a digital addressable lighting interface (DALI) protocol; (5) a ZigBee protocol; and/or (6) a combination of any one or more thereof. In a further embodiment, the first wireless communication system is a Bluetooth Low Energy system (BTLE), which is available as a system on chip.

The communication arrangement 400 may be destined to make use of a feature provided in the standardized protocol for NFC communication that allows automatic actuation of another system, different to the present NFC system and possibly of a communication type being more capable than the NFC system.

Based on this feature, an NFC entity, which is composed of an electronic NFC device 210 and the NFC antenna 141 will be able, when in communication with a NFC reader/writer (not shown), to activate the second wireless communication system 430 housed in the plate 410, which is, for instance, the Bluetooth Low energy system mentioned above. In the course of the activation of the Bluetooth system housed in the plate 410, the Bluetooth system will request pairing with another Bluetooth system (not shown) reachable within the Bluetooth range.

For a power supply of the second wireless communication system 430 (in the following represented by the Bluetooth Low Energy system), an energy storage element 420, (shown in dashed lines on top of the plate 410) is provided. The energy storage element 420 may be a battery, a capacitor or an accumulator, which will be connected to power supply pins (not shown) of the Bluetooth Low Energy system 430 in the coarse of the activation of the Bluetooth Low Energy system 430 by the NFC system 210.

A connection of the energy storage element 420 to the power supply pins of the Bluetooth Low Energy system 430 may accomplished by a power-on switch (not shown) activatable by the electronic NFC device 210. The power-on switch may be integrated into the electronic NFC device 210.

Enhanced Wireless systems as Bluetooth or Wireless-LAN allow a much wider communication range than NFC systems, but they also have higher demands with respect to their power supply. In this sense the NFC system may take care that the second wireless communication system is only enabled when necessary, which improves durability of the energy storage element 420. Further, as the second wireless communication system is operated, i.e. enabled, only by the NFC system, security is highly improved.

Alternative embodiments may provide an additional sensing-switching arrangement, which may be basically configured according to a first and/or second sensing-switching arrangement to enable the second wireless communication system. The additional sensing-switching arrangement may be further configured to allow operation of the second wireless communication system, independently or only together with an enablement by the NFC system.

Since currently available NFC systems are held rather simple, they do not have advanced processing capabilities. Those capabilities however can be provided by other wireless communication systems, for instance, by the Bluetooth and WiFi systems as mentioned above that also allow advanced functions, analyses and cryptography.

Figure 5:
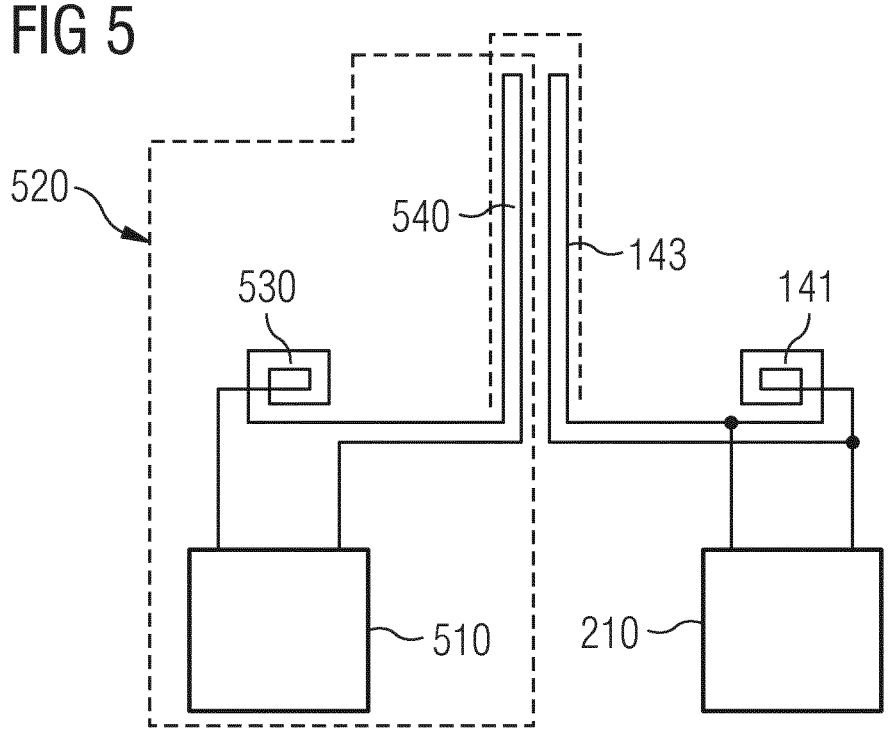
FIG. 5 shows a schematic block view of structural elements of a first and a further NFC system.

FIG. 5 illustrates in a schematic block view a structure of an embodiment including a further wireless communication system 520, which is provided additionally to the first communication system 210 and wherein the first and the further communication systems 210, 520 are each represented by a respective NFC system 210, 510. The further wireless communication system 520 may be additionally included in any of the previously described embodiments and serves as a communication system that allows standardized communication before an initial opening event and/or unloading event takes place and preferably will be disabled afterwards.

In this sense the embodiment offers a solution for a communication with a NFC System 210, e.g. placed on an RFID label 140, before an initial opening event and/or unloading event occurs, whereby any data written into the electronic NFC device 510 before an initial opening event and/or unloading event occurs, will not be accessible by a standardized communication after the initial opening event and/or unloading event. In other words, only one of the first and the further communication systems 210, 520 has its primary operation mode enabled at any time.

The right side of the figure shows the basic elements of the first wireless communication system 210 as already described with respect to FIG. 1 and FIGS. 2A, 2B and 2C, in particular the electronic NFC device 210, the NFC antenna 141 and the first sensing-switching arrangement 143, 280 represented by a breakable conductive loop 143, connected in parallel to the NFC antenna 141. Although the shown embodiment is related to the first sensing-switching arrangement 143, it can be easily modified to be implemented for a second sensing-switching arrangement 280.

The left side of the figure shows the basic elements of the further wireless communication system 520, represented by a further NFC system 510 including a further electronic NFC device 510, a further NFC antenna 530 and a third sensing-switching arrangement 540, represented by a further breakable conductive loop 540. The further breakable conductive loop 540 is connected in series with the further NFC antenna 530. Both breakable conductive loops 143, 540 are arranged close to each other, to ensure that a break of any of the breakable conductive loops 143, 540 will affect the other one as well.

FIG. 6 illustrates in a pure schematic block view a structure of an embodiment, which provides an alternative and less expensive solution for ensuring that data written into the electronic NFC device 210 before an initial opening event and/or unloading event occurs, will not be accessible by a communication after the initial opening event and/or unloading event.

The figure shows the basic elements of the first wireless communication system 210 as basically described with respect to FIG. 1 and FIGS. 2A, 2B and 2C, in particular the electronic NFC device 210, the NFC antenna 141 and the first sensing-switching arrangement 143 represented by a breakable conductive loop 143. Although the shown embodiment is related to the first sensing-switching arrangement 143, it can be easily modified to be implemented for a second sensing-switching arrangement 280.

A deeper look into the electronic NFC device 210 shows a controller unit 600 including an analog and a digital processor (not shown), a digital data storage unit 610 having address connection lines 630 and data connection lines 620, and a power supply unit 660 for supplying direct current to the controller unit 600 and the data storage unit 610. The direct current is generated from the current received by the NFC antenna 141 through induction.

The controller unit 600, which can be considered as a microcontroller, is connected to the data storage unit 210 by multiple address connection lines 630 and multiple data connection lines 620. One address connection line 650 of the address connection lines 630, preferably the most significant address connection line bearing the most significant bit of all bits used for a binary addressing of the data storage areas within the data storage unit 210, is connected via a pull up resistor 640 to a positive potential provided by the power supply unit 660. The breakable conductive loop 143 is connected with one of its ends to the address connection line 650 and with the other end to a ground potential provided by the power supply unit 660.

Since the most significant address connection line is used to distinguish the data storage area into a first and a second data storage area 680, 670, the most significant address connection line can be considered as a select connection line 650, which enables either the first or the second data storage area 680, 670.

As long as the breakable conductive loop 143 is unbroken, the ground potential from the power supply unit 660 is fed to the address connection line 650, thereby selecting one of the first or second data storage areas 680, 670. When the breakable conductive loop 143 is broken, the positive potential of the power supply unit 660 is fed via the pull-up resistor 640 to the address connection line 650, thereby selecting that data storage area of the first and second data storage areas 680, 670 that has not been selected before, when the breakable conductive loop 143 was unbroken.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A container arrangement, comprising:
   a container body comprising an interior for receiving solid matters or liquids;
   a first wireless communication system, wherein the first wireless communication system is composed of a Near Field Communication system including a Near Field antenna formed by a conductor arranged in one or more windings; a controller and a data storage area;
   a first sensing-switching arrangement and a second sensing-switching arrangement,
   wherein the first sensing-switching arrangement is configured to include a first preset status disabling a primary operation mode of the first wireless communication system, wherein the first sensing-switching arrangement is configured to deregulate irreversibly its first preset status upon an initial opening event;
   wherein the second sensing-switching arrangement is configured to include a second preset status disabling the primary operation mode of the first wireless communication system, wherein the second sensing-switching arrangement is configured to deregulate its second preset status upon an unloading event and only for the duration of the respective unloading event, which refers to an unloading act of contents of the container body; and
   wherein the first and any subsequent unloading acts from the interior trigger the unloading event respectively, wherein
   i) the first preset status includes an enabling of an alternative operation mode of the Near Field Communication system; or
   ii) the first preset status includes a fully disabled operability of the Near Field Communication system and the second preset status includes an enabling of an alternative operation mode of the Near Field Communication system.

2. The container arrangement according to claim 1, wherein the first preset status or the second preset status includes a disabled accessibility of the controller to the data storage area.

3. The container arrangement according to claim 2, wherein the Near Field Communication system includes a further data storage area, which is different to the data storage area, and to which accessibility is enabled when accessibility to the data storage area is disabled and to which accessibility is disabled when accessibility to the data storage area is enabled.

4. The container arrangement according to claim 1, wherein the first sensing-switching arrangement comprises a breakable conductive loop connected in parallel to the Near Field antenna and disposed such that an initial opening of the aperture breaks the breakable conductive loop; and
   wherein the breakable conductive loop comprises an electronic component or a circuit composed of more than one electronic component looped in the breakable conductive loop therewith shifting a resonance frequency of the Near field antenna in an area outside a range.

5. The container arrangement according to claim 2, wherein the first sensing-switching arrangement comprises a breakable conductive loop connected at one end to a select connection line of the data storage area and/or further data storage area.

6. The container arrangement according to claim 1, wherein the second sensing-switching arrangement comprises a contact switch looped into the conductor of the Near Field antenna; and
   wherein the contact switch is configured such that it will close circuit upon a mechanical force, exerted for an unloading act.

7. The container arrangement according to claim 2, wherein the second sensing-switching arrangement comprises a contact switch connected to a select connection line of the data storage area and/or further data storage area; and
   wherein the contact switch is configured such that it will close or open circuit upon a mechanical force, exerted for an unloading act.

8. The container arrangement according to claim 1, wherein when the first preset status includes the fully disabled operability of the Near Field communication system, the container arrangement further comprises:
   a further wireless communication system comprising a further Near Field Communication system including a further Near Field antenna formed by a further conductor; and
   a third sensing-switching arrangement configured to include a preset status enabling an operability of the further wireless communication system, wherein the third sensing-switching arrangement is configured to deregulate its preset status upon an initial opening event or an unloading event.

9. The container arrangement according to claim 8, wherein the third sensing-switching arrangement comprises a further breakable conductive loop disposed such that an initial opening or an unloading breaks the further breakable conductive loop.

10. The container arrangement according to any of the claim 1, further comprising:
    a second wireless communication system configured to include a preset status of disabled operability, wherein the first wireless communication system, when in the primary operation mode, is configured to deregulate the preset status of the second wireless communication system.

11. The container arrangement according to claim 10, wherein the first wireless communication system is configured to deregulate the preset status of the second wireless communication system irreversibly or only for a time period to be determined by the first wireless communication system or only for a time period in which the primary operation mode is enabled.

12. The container arrangement according to claim 10, wherein the second wireless communication system includes at least one of IEEE 802.11 (Wireless LAN) system or a digital multiplexer (DMX) interface system or a digital addressable lighting interface (DALI) system or a ZigBee system or a Bluetooth system.

13. The container arrangement according to claim 10, further comprising:
an energy storing element, wherein the second wireless communication system is configured to be powered by the energy storing element.

14. A method for operating a wireless communication system of a container arrangement having a container body, a first wireless communication system composed of a Near Field Communication system, a first sensing-switching arrangement including a first preset status disabling a primary operation mode of the first wireless communication system, and a second sensing-switching arrangement including a second preset status disabling the primary operation mode of the first wireless communication system, the method comprising:
deregulating the first preset status of the first sensing-switching arrangement irreversibly upon an initial opening event; and
deregulating the second preset status of the second sensing-switching arrangement upon an unloading event and only for the duration of the respective unloading event, which refers to an unloading act of contents of the container body, wherein the first and any subsequent unloading acts from an interior of the container body trigger the unloading event respectively, wherein
i) the first preset status includes an enabling of an alternative operation mode of the Near Field Communication system; or
ii) the first preset status includes a fully disabled operability of the Near Field Communication system and the second preset status includes an enabling of an alternative operation mode of the Near Field Communication system.

\* \* \* \* \*